(12) United States Patent
Ikuta et al.

(10) Patent No.: US 11,993,303 B2
(45) Date of Patent: May 28, 2024

(54) STEERING DEVICE

(71) Applicant: NSK LTD., Tokyo (JP)

(72) Inventors: Tomohiro Ikuta, Gunma (JP); Yoshiyuki Sato, Gunma (JP); Suguru Sugishita, Gunma (JP); Hirotaka Shimizu, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/915,938

(22) PCT Filed: Mar. 25, 2021

(86) PCT No.: PCT/JP2021/012715
§ 371 (c)(1),
(2) Date: Sep. 29, 2022

(87) PCT Pub. No.: WO2021/200597
PCT Pub. Date: Oct. 7, 2021

(65) Prior Publication Data
US 2023/0143956 A1    May 11, 2023

(30) Foreign Application Priority Data
Mar. 30, 2020   (JP) ................................. 2020-059355

(51) Int. Cl.
*B62D 1/185*   (2006.01)
*B62D 5/04*    (2006.01)

(52) U.S. Cl.
CPC ............ *B62D 1/185* (2013.01); *B62D 5/0409* (2013.01)

(58) Field of Classification Search
CPC ....... B62D 1/185; B62D 5/0409; B62D 1/184
See application file for complete search history.

(56) References Cited

U.S. PATENT DOCUMENTS 5,439,252 A * 8/1995 Oxley .................... B62D 1/184
                                                        280/775
8,882,147 B2 * 11/2014 Schnitzer ............... B62D 1/184
                                                        280/775
(Continued)

FOREIGN PATENT DOCUMENTS

JP     05-082747 U      11/1983
JP     05-082747     *  11/1993
(Continued)

OTHER PUBLICATIONS

International Search Report for PCT/JP2021/012715 dated May 11, 2021 [PCT/ISA/210].

*Primary Examiner* — Drew J Brown
(74) *Attorney, Agent, or Firm* — Sughrue Mion, PLLC

(57) ABSTRACT

A steering device includes a telescopic steering shaft that extends in a first direction, and a cylindrical outer steering column that rotatably supports the steering shaft. The steering column includes a lower column and an upper column having one end slidably attached to the lower column and the other end on which a bearing that supports the steering shaft is provided. The upper column includes a clamp that is externally slidably fitted to the lower column and that has a slit extending in the first direction, and a cylindrical part that has a cylindrical shape and that has one end continuous with the clamp and the other end blocked by the bearing being internally fitted. The cylindrical part has an air hole that is spaced apart from the one end of the cylindrical part and that penetrates an outer peripheral surface and an inner peripheral surface of the cylindrical part.

3 Claims, 9 Drawing Sheets

(56) References Cited

U.S. PATENT DOCUMENTS

| | | | |
|---|---|---|---|
| 8,967,017 B2 * | 3/2015 | Osawa | B62D 1/184 |
| | | | 280/775 |
| 9,550,513 B2 * | 1/2017 | Fujiwara | B62D 1/187 |
| 2013/0327177 A1 | 12/2013 | Tanaka | |

FOREIGN PATENT DOCUMENTS

| | | |
|---|---|---|
| JP | 2002-274394 A | 9/2002 |
| JP | 2011-251610 A | 12/2011 |
| JP | 2013-023040 A | 2/2013 |
| JP | 2013-256193 A | 12/2013 |
| KR | 10-2011-0064611 A | 6/2011 |

* cited by examiner

FIG.6
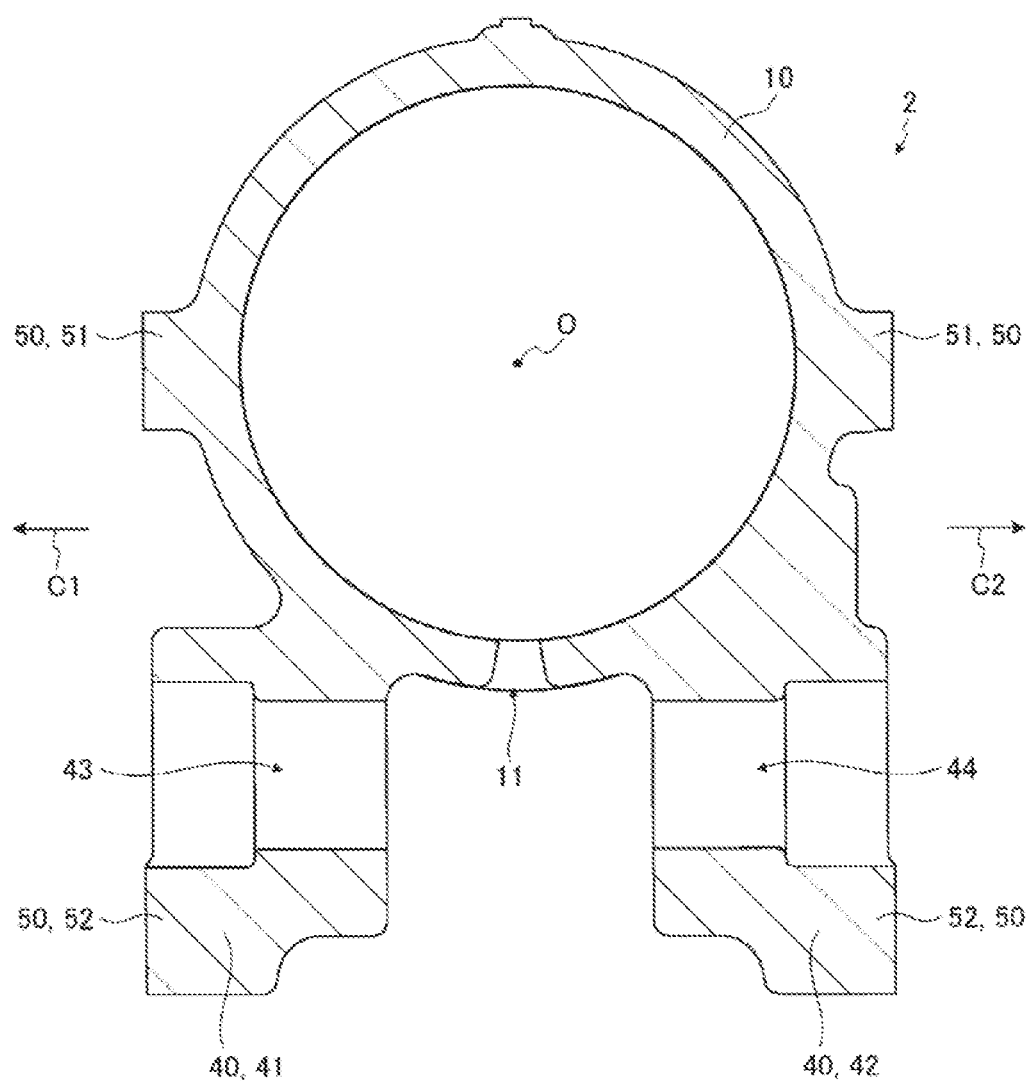
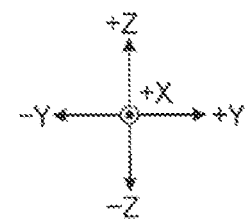

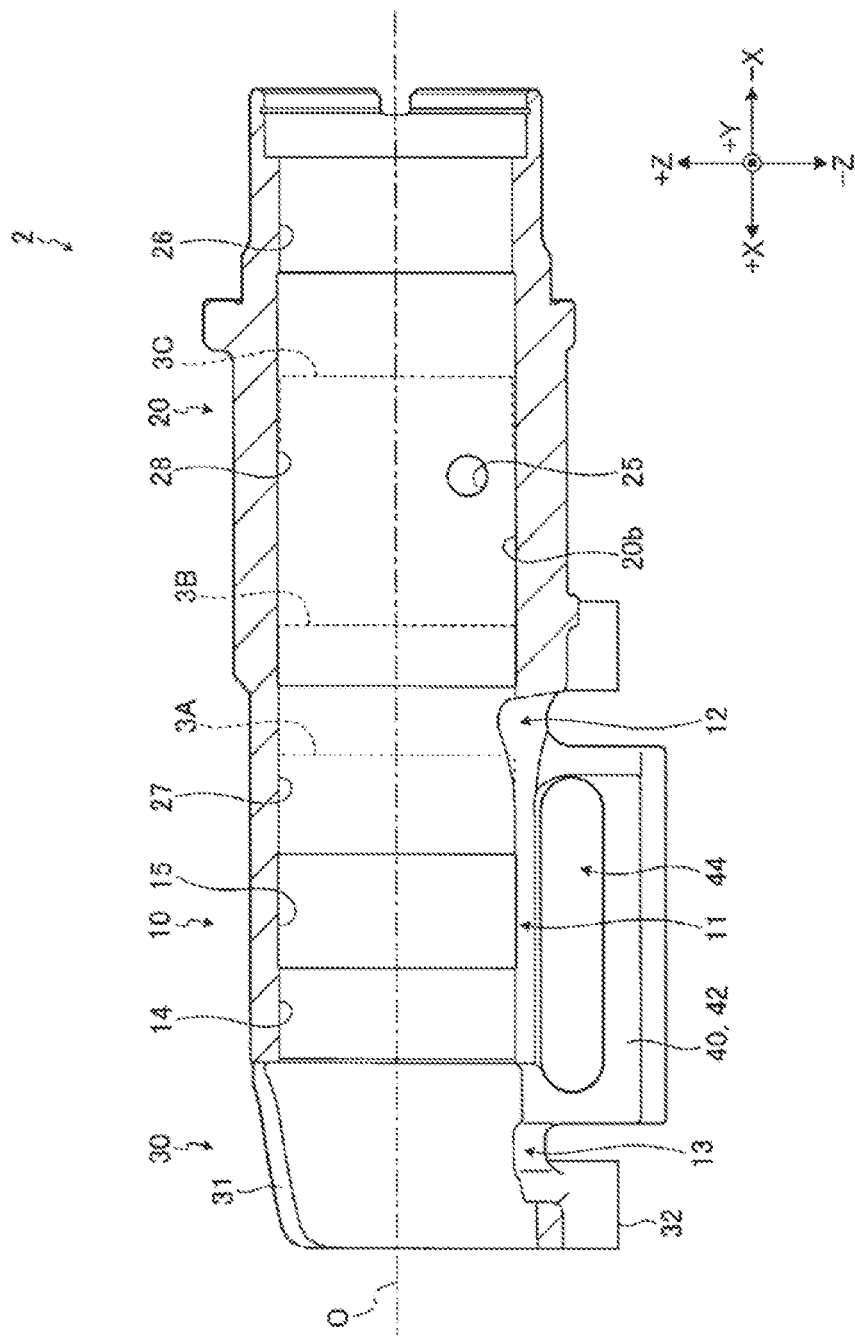

STEERING DEVICE

CROSS REFERENCE TO RELATED APPLICATIONS

This application is a National Stage of International Application No. PCT/JP2021/012715 filed Mar. 25, 2021, claiming priority based on Japanese Patent Application No. 2020-059355 filed Mar. 30, 2020.

FIELD

The present invention relates to a steering device.

BACKGROUND

A vehicle is provided with a steering device to transmit a steering wheel operation of a driver to the wheels. Such a steering device includes a steering shaft to which a steering wheel is attached, and a cylindrical outer steering column that rotatably supports the steering shaft. The steering device may include a mechanism that can change a position of the steering wheel in an axial direction of the steering shaft. For example, a steering shaft disclosed in Patent Literature 1 has a lower shaft and an upper shaft that is slidably coupled to the lower shaft. The steering column includes a lower column that encloses the lower shaft and an upper column that is slidably coupled to the lower column. In a case in which a load is applied to the steering wheel in the axial direction, the upper shaft slides, and the steering wheel is displaced in the axial direction. In addition, the upper column slides following a slide of the upper shaft.

Furthermore, the upper column disclosed in Patent Literature 1 includes a clamp that is externally slidably fitted to the lower column, a cylindrical part that has a cylindrical shape and extends from the clamp toward the steering wheel, and a pair of protrusions that radially protrude outward from an outer peripheral surface of the clamp. A slit that extends in the axial direction is provided in the clamp. A bearing that supports the upper shaft is internally fitted to the cylindrical part. The pair of protrusions is disposed so that the slit of the clamp is interposed therebetween. In a case in which a compressive load acts on the pair of protrusions, a groove width of the slit of the clamp is narrowed. In other words, the clamp clamps the lower column disposed therein. As a result, the upper column is restricted not to slide on the lower column. The upper shaft supported by the cylindrical part is also restricted not to slide; thereby, a position of the steering wheel is secured.

CITATION LIST

Patent Literature

Patent Literature 1: Japanese Patent Application Laid-open No. 2013-256193

SUMMARY

Technical Problem

Meanwhile, regarding both ends of the cylindrical part, one end side that is continuous with the clamp is opened, but the inside of the cylindrical part at the other end side near the steering wheel is blocked by the bearing and the upper shaft. Thus, the inside of the cylindrical part communicates with the external space through the slit of the clamp. However, in a case in which the lower column enters one end of the cylindrical part, the one end of the cylindrical part is blocked. In addition, the lower column enters the cylindrical part to compress air inside the cylindrical part. As a result, the air inside the cylindrical part passes through between an outer peripheral surface of the lower column and the inner peripheral surface of the cylindrical part and leaks to the external space. The outer peripheral surface of the lower column and the inner peripheral surface of the cylindrical part are slidable surfaces, and grease is applied on the surfaces. Therefore, the grease may be discharged to the external space along with the air that passes through between the lower column and the cylindrical part. In the above-mentioned Patent Literature 1, the upper column includes the cylindrical part and the clamp, but in a steering device in the related art, the lower column may include the cylindrical part and the clamp. In this case, the same problem as in the case in which the upper column enters the cylindrical part of the lower column occurs.

The present disclosure has been made in view of the above-mentioned problem, and an object thereof is to provide a steering device that can prevent grease from being discharged even though the lower column enters the inside of the cylindrical part of the upper column.

Alternatively, an object of the present disclosure is to provide a steering device that can prevent grease from being discharged even through the upper column enters the inside of the cylindrical part of the lower column.

Solution to Problem

To achieve the above-mentioned object, a steering device according to one aspect of the present disclosure includes: a telescopic steering shaft that extends in a first direction; and a cylindrical outer steering column that rotatably supports the steering shaft, wherein the steering column includes a lower column, and an upper column having one end that is slidably attached to the lower column and another end on which a bearing that supports the steering shaft is provided, the upper column includes a clamp that is externally slidably fitted to the lower column and that has a slit extending in the first direction, and a cylindrical part that has a cylindrical shape and that has one end continuous with the clamp and another end blocked by the bearing being internally fitted, and the cylindrical part has an air hole that is spaced apart from the one end of the cylindrical part and that penetrates an outer peripheral surface and an inner peripheral surface of the cylindrical part.

The inside of the cylindrical part is always opened because of an air hole. Therefore, when the lower column enters the inside of the cylindrical part, air inside the cylindrical part is discharged to the outside of an external space through the air hole. Therefore, grease applied to the outer peripheral surface of the lower column and the inner peripheral surface of the cylindrical part is not discharged to the external space with air.

In the steering device, in a state where the steering shaft is shortened, the lower column and the air hole may overlap in a direction orthogonal to the first direction.

In the steering device according to a desirable aspect, the inner peripheral surface of the cylindrical part may include a first inner diameter part that is capable of being brought into slide-contact with an outer peripheral surface of the lower column, and a second inner diameter part having an inner diameter larger than that of the first inner diameter part, and the air hole may penetrate the second inner diameter part.

In a state where the lower column has entered the inside of the cylindrical part, the lower column is supported by a first inner diameter part. Therefore, the rattling of the upper column against the lower column is eliminated. When the lower column enters the inside of the cylindrical part, a gap is formed between the lower column and a second inner diameter part. Accordingly, the air hole is always opened, and the air inside the cylindrical part can be discharged reliably.

The steering device according to a desirable aspect includes a bracket including a first side plate and a second side plate that sandwich the clamp from a second direction orthogonal to the first direction; and a fastening mechanism that has a fastening shaft penetrating the first side plate and the second side plate to fasten the first side plate and the second side plate, wherein the upper column includes a pair of protrusions between which the slit is interposed, the protrusions protruding radially outward from the clamp and being pressed by the first side plate and the second side plate during fastening with the fastening mechanism, the pair of protrusions has long grooves into which the fastening shaft is inserted, and a penetration direction of the air hole is parallel to a penetration direction of the long grooves.

In a case in which the air hole and long grooves are formed by casting, releasing directions of molds for forming the air hole and the long grooves are unified in the same direction. In other words, the air hole and the long grooves for telescopic movement can be formed with a single mold, which facilitates the production of the upper column.

To achieve the above-mentioned object, a steering device according to one aspect of the present disclosure includes: a telescopic steering shaft that extends in a first direction; and a cylindrical outer steering column that rotatably supports the steering shaft, wherein the steering column includes a lower column, and an upper column having one end that is slidably attached to the lower column and another end on which a bearing that supports the steering shaft is provided, the lower column includes a cylindrical part that has a cylindrical shape, and a clamp that protrudes from one end of the cylindrical part, that is externally slidably fitted to the upper column, and that has a slit extending in the first direction, and the cylindrical part has an air hole that is spaced apart from the one end of the cylindrical part and that penetrates an outer peripheral surface and an inner peripheral surface of the cylindrical part.

The inside of the cylindrical part is always opened because of an air hole. Therefore, when the upper column enters the inside of the cylindrical part, air inside the cylindrical part is discharged to the outside of an external space through the air hole. Therefore, grease applied to an outer peripheral surface of the upper column and the inner peripheral surface of the cylindrical part is not discharged to the external space with air.

In the steering device, in a state where the steering shaft is shortened, the upper column and the air hole may overlap in a direction orthogonal to the first direction.

In the steering device according to a desirable aspect, the inner peripheral surface of the cylindrical part may include a first inner diameter part that is capable of being brought into slide-contact with an outer peripheral surface of the upper column, and a second inner diameter part having an inner diameter larger than that of the first inner diameter part, and the air hole may penetrate the second inner diameter part.

In a state where the upper column has entered the inside of the cylindrical part, the upper column is supported by the first inner diameter part. Therefore, the rattling of the upper column against the lower column is eliminated. In a case in which the upper column enters the inside of the cylindrical part, a gap is formed between the upper column and the second inner diameter part. Accordingly, the air hole is always opened, and the air inside the cylindrical part can be discharged reliably.

Advantageous Effects of Invention

The steering device of the present disclosure can prevent grease from being discharged even though the lower column enters the inside of the cylindrical part of the upper column. Alternatively, the steering device can prevent grease from being discharged even though the upper column enters the inside of the cylindrical part of the lower column.

BRIEF DESCRIPTION OF DRAWINGS

FIG. 6 is across-sectional view cut along VI-VI line illustrated in FIG. 5.

FIG. 9 is a cross-sectional view of the upper column of the present embodiment cut along the axis.

DESCRIPTION OF EMBODIMENTS

Hereinafter the present invention is described in detail with reference to the drawings. The present invention is not limited to the following embodiment (hereinafter referred to as "embodiment"). In addition, components in the following embodiment include components capable of being readily assumed by those skilled in the art, components substantially identical, and components within the so-called equal range. Furthermore, the components disclosed in the following embodiment can be combined as appropriate.

Figure 1:
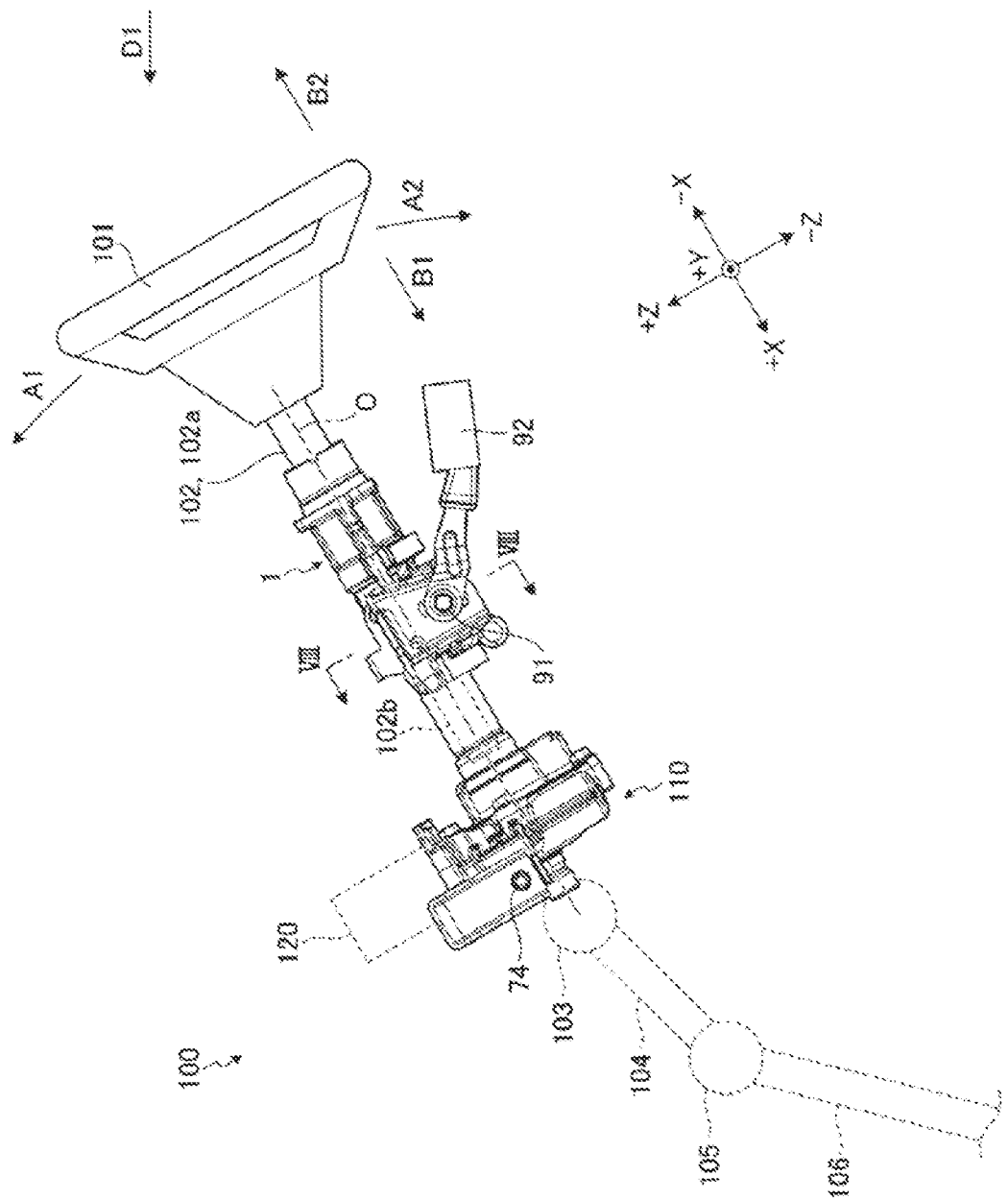
FIG. 1 is a side view of a steering device of the present embodiment.
Figure 2:
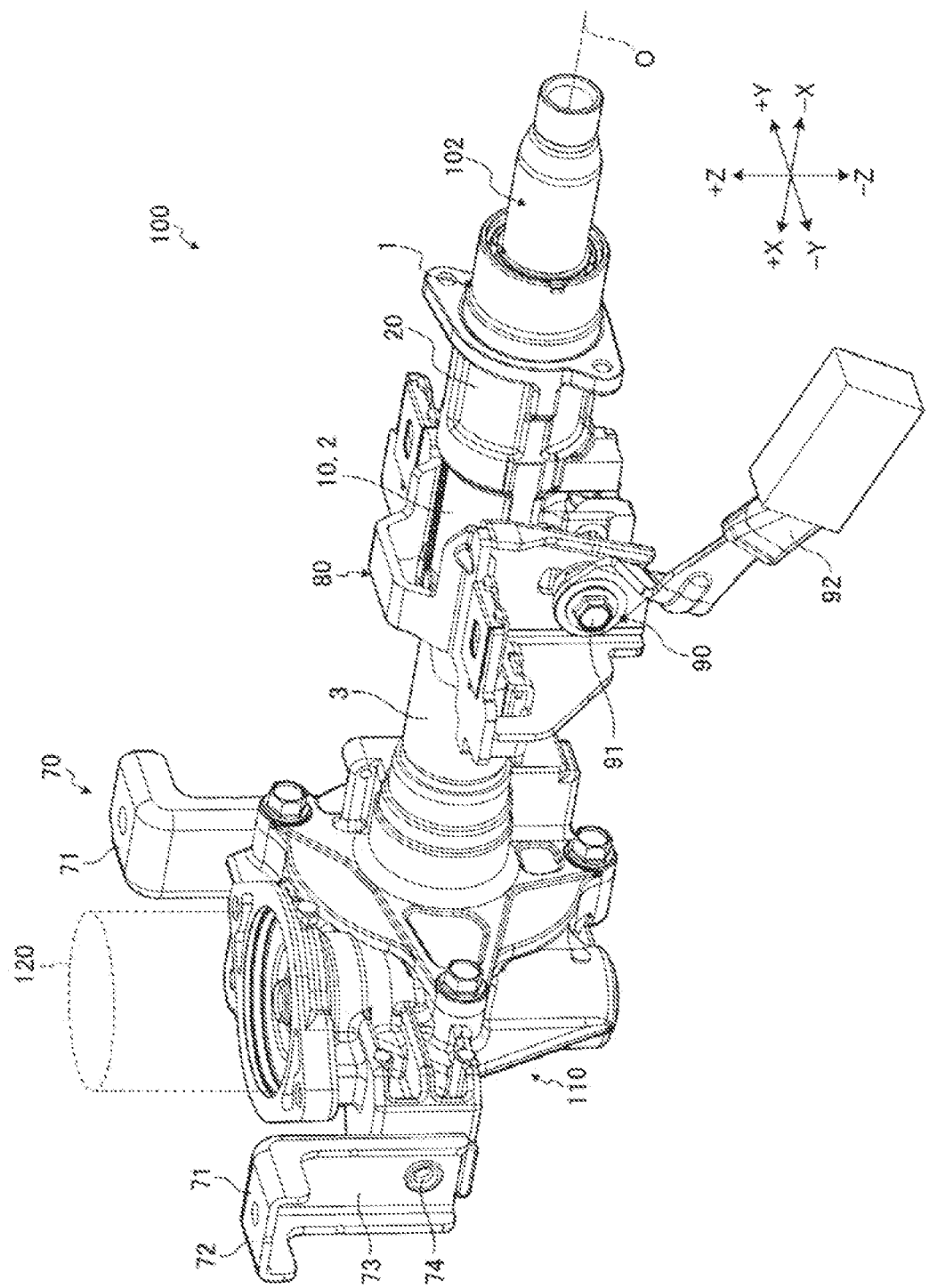
FIG. 2 is a perspective view of the steering device of the present embodiment.
Figure 3:
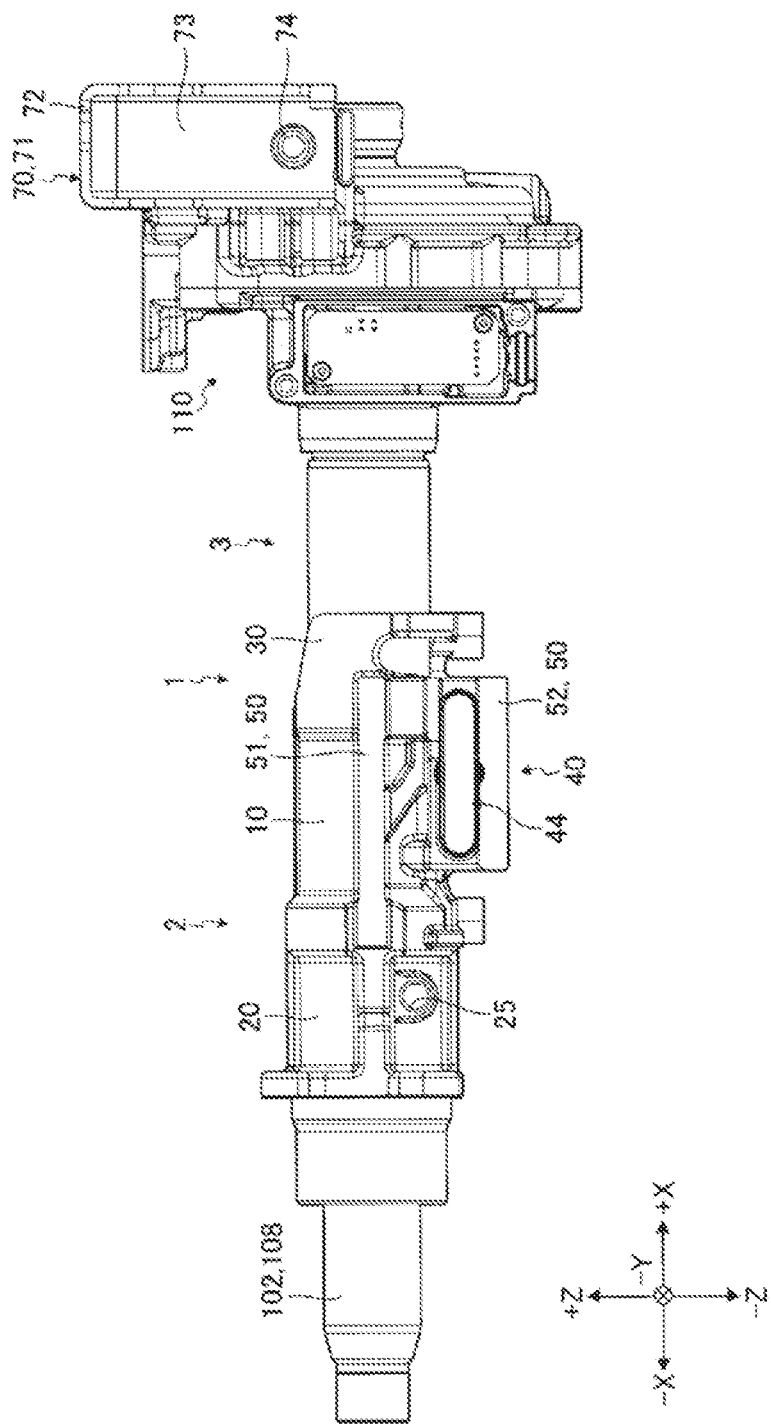
FIG. 3 is a side view of the steering device of the present embodiment.
Figure 4:
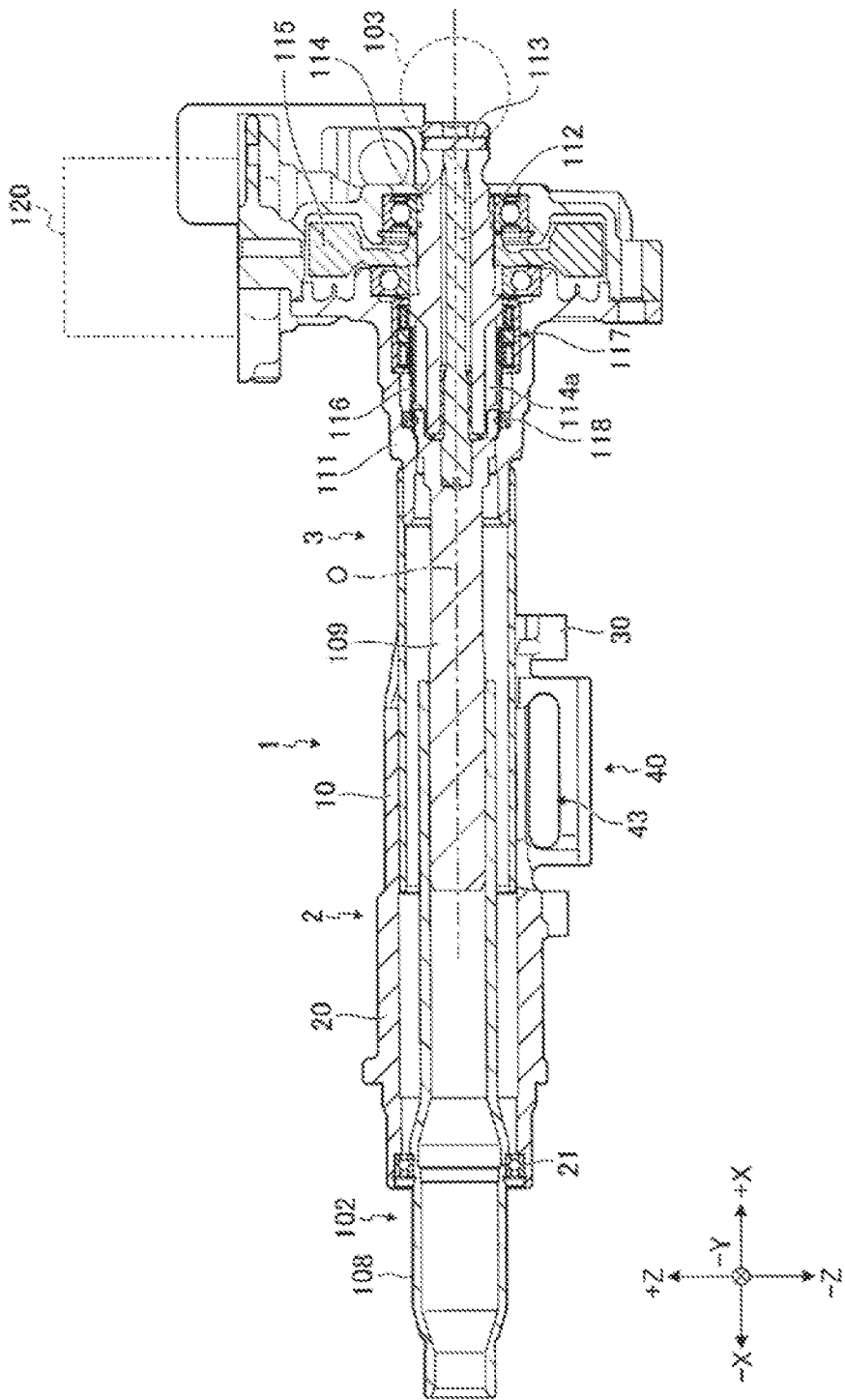
FIG. 4 is a cross-sectional view of the steering device cut along an axis illustrated in FIG. 3.
Figure 5:
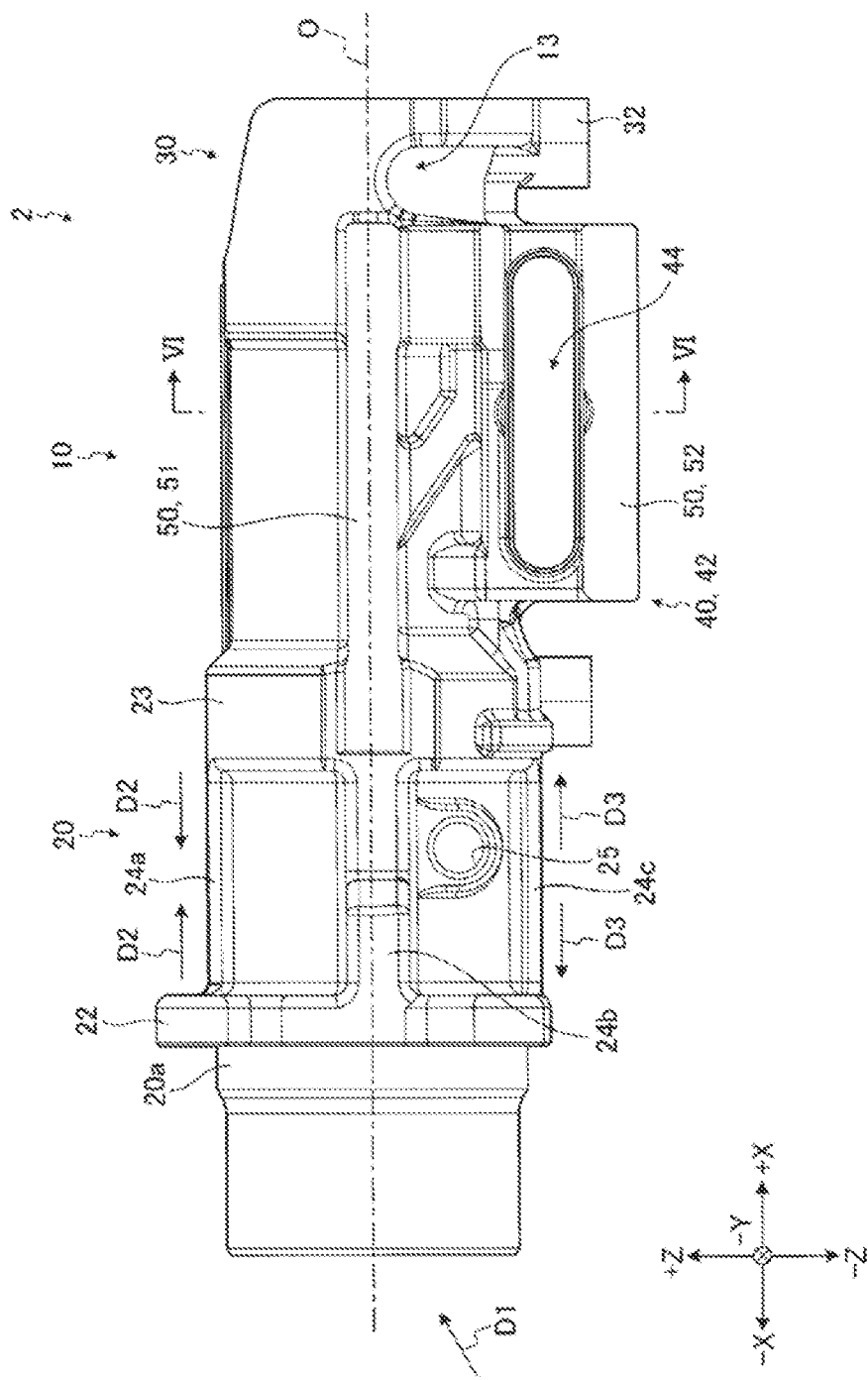
FIG. 5 is a side view of an upper column of the present embodiment.
Figure 7:
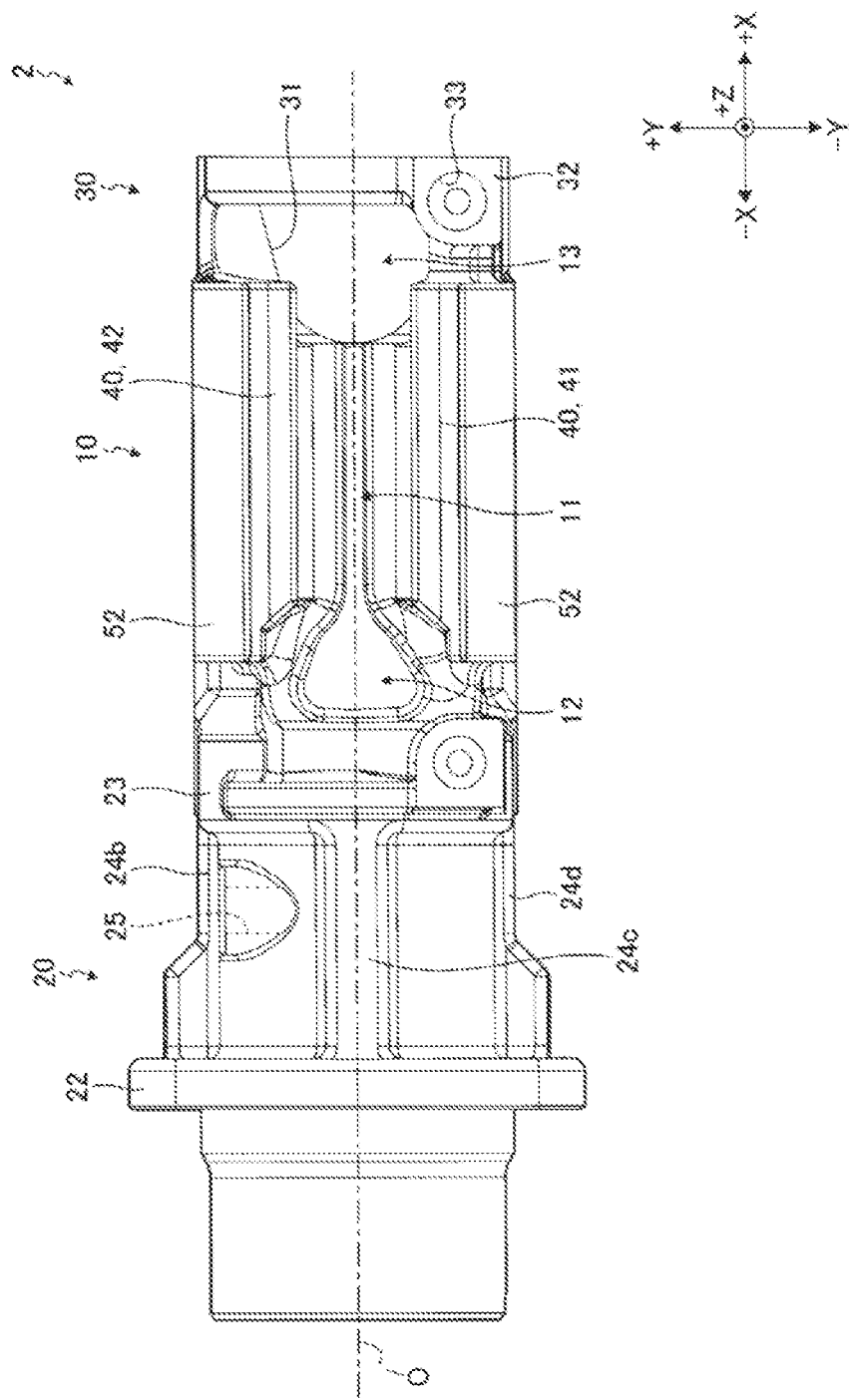
FIG. 7 is a bottom view of the upper column of the present embodiment.
Figure 8:
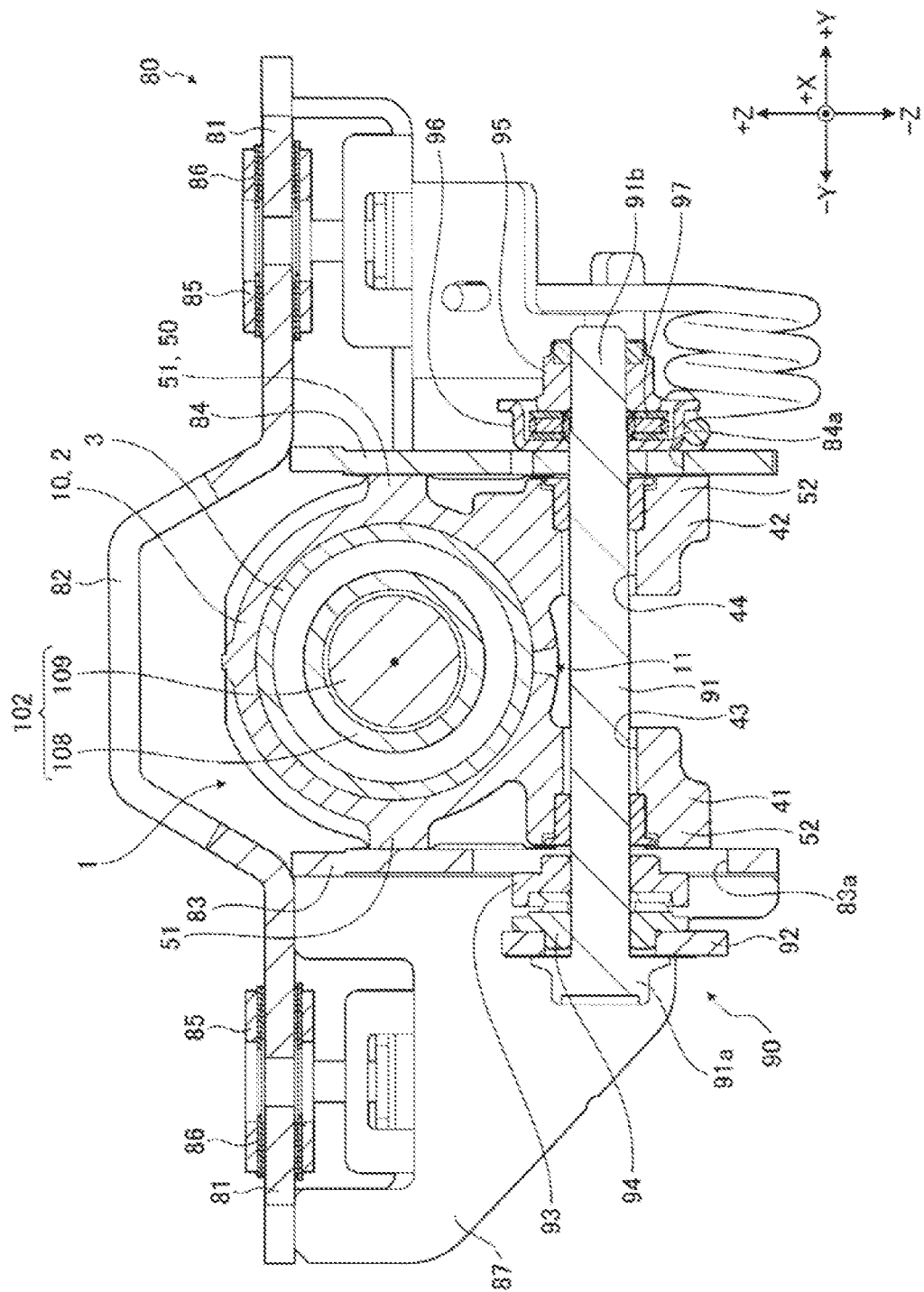
FIG. 8 is a cross-sectional view cut along VII-VIII line illustrated in FIG. 1.

FIG. 1 is a side view of a steering device of the present embodiment. FIG. 2 is a perspective view of the steering device of the present embodiment. FIG. 3 is a side view of the steering device of the present embodiment. FIG. 4 is a cross-sectional view of the steering device cut along an axis illustrated in FIG. 3. FIG. 5 is a side view of an upper column of the present embodiment. FIG. 6 is a cross-sectional view cut along VI-VI line illustrated in FIG. 5. FIG. 7 is a bottom view of the upper column of the present embodiment. FIG. 8 is a cross-sectional view cut along VIII-VIII line illustrated in FIG. 1. FIG. 9 is a cross-sectional view of the upper column of the present embodiment cut along the axis.

First, a basic configuration of a steering device 100 is described. As illustrated in FIG. 1, the steering device 100 includes a steering wheel 101, a steering shaft 102, a first universal joint 103, an intermediate shaft 104, a second universal joint 105, and a pinion shaft 106.

The steering wheel 101 is attached to one end 102a of the steering shaft 102 in a case in which a driver operates the steering wheel 101, the steering shaft 102 rotates around an axis O, and an operation torque is applied to the steering shaft 102.

A gearbox 110 is interposed between the other end 102b of the steering shaft 102 and the first universal joint 103. An electric motor 120 is assembled with the gearbox 110 to provide an assist torque to the steering shaft 102. In other words, the steering device 100 of the present embodiment is an electric power steering device that assists steering of the driver by using the electric motor 120. The present invention may be applied to a steering device without the gearbox 110.

One end of the intermediate shaft 104 is coupled to the first universal joint 103. The pinion shaft 106 is coupled to the other end of the intermediate shaft 104 through the second universal obit 105. As described above, the operation torque of the steering shaft 102 is transmitted to the pinion shaft 106 through the first universal joint 103, the intermediate shaft 104, and the second universal joint 105.

As illustrated in FIG. 2, the steering device 100 further includes a steering column 1, a first bracket 70, a second bracket 80, and a fastening mechanism 90, in addition to the above-mentioned components. Next, the details of each component of the steering device 100 will be described. The XYZ Cartesian coordinate system is used in the following description. An X axis is parallel to the axis O of the steering shaft 102. A Y axis is parallel to a vehicle width direction of a vehicle on which the steering device 100 is mounted. A Z axis is perpendicular to both the X and Y axes. A direction parallel to the X axis is described as the X direction, a direction parallel to the Y axis is described as the Y direction, and a direction parallel to the Z axis is described as the Z direction. A direction toward the front of the vehicle in the X direction is a +X direction. In a case in which an operator faces the +X direction, the right direction is a +Y direction. The upward direction in the Z direction is a +Z direction. The X direction is sometimes referred to as a first direction, and the Y direction may be referred to as a second direction.

As illustrated in FIG. 3, the steering shaft 102 is assembled in a state or protruding from an end of the steering column 1 in a −X direction. As illustrated in FIG. 4, the steering shaft 102 has an upper shaft 108 that is a cylindrical shaft, and a lower shaft 109 that is a solid shaft. The steering wheel (see FIG. 1) is attached to an end of the upper shaft 108 in the −X direction. An end of the upper shaft 108 in the +X direction is externally fitted to the lower shaft 109. The end of the upper shaft 108 in the −X direction and an end of the lower shaft 109 in the −X direction are spline-fitted to each other. Therefore, the upper shaft 108 can slide on the lower shaft 109 in the X direction.

An end of the lower shaft 109 in the +X direction enters the inside of a housing ill of the gearbox 110. A torsion bar 112, an output shaft 114 that is an outer cylinder of the torsion bar 112, and a worm wheel 115 that is externally fitted to the output shaft 114 are provided inside the housing 111 of the gearbox 110. The worm wheel 115 is engaged with a worm (not illustrated) that is coupled to the output shaft 114 of the electric motor 120. Therefore, in a case in which the electric motor 120 is driven, a torque is applied to the output shaft 114.

An outer peripheral surface at the end of the lower shaft 109 in the +X direction is brought into slide-contact with a seal member 118 fitted to an inner peripheral surface of the housing 111. The end of the lower shaft 109 in the +X direction is coupled to an end of the torsion bar 112 in the −X direction. An end of the torsion bar 112 in the +X direction is coupled to the output shaft 114 by a fixing pin 113. The first universal joint 103 is coupled to an end of the output shaft 114 in the +X direction. Therefore, a steering torque of the lower shaft 109 is transmitted to the intermediate shaft 104 (see FIG. 1) through the torsion bar 112, the output shaft 114, and the first universal joint 103. The torsion bar 112 twists in response to the steering torque of the lower shaft 109, so that an angular difference in rotation between the lower shaft 109 and the output shaft 114.

In order to eliminate the angular difference in rotation between the lower shaft 109 and the output shaft 114, a torque detection groove 114a is formed at an end of the output shaft 114 in the −X direction. A cylindrical member 116 is disposed on an outer peripheral side of the torque detection groove 114a. The cylindrical member 116 is fixed to the end of the lower shaft 109 in the +X direction and is integrally rotated with the lower shaft 109. The cylindrical member 116 has a plurality of windows (not illustrated) penetrating in a radial direction. A torque sensor 117 is disposed on an outer peripheral side of the cylindrical member 116.

The torque sensor 117 transmits a detection result to a torque detection circuit board (not illustrated) that is provided inside the housing 111, and the torque detection circuit board detects the angular difference in rotation between the lower shaft 109 and the output shaft 114. The torque detection circuit board causes the electric motor 120 to be driven based on the detection result to provide a steering assist torque to the output shaft 114. As a result, the same angle in rotation between the lower shaft 109 and the output shaft 114 is achieved.

As illustrated in FIG. 2, the first bracket 70 includes a pair of support pieces 71. The support pieces 71 are spaced apart from each other in the Y direction. Each of the support pieces 71 includes an attachment plate 72 extending in the X direction and the Y direction and a support plate 73 extending in the X direction and the Z direction. The attachment plate 72 is fixed to a vehicle body by a bolt (not illustrated). A pivot shaft 74 extending in the Y direction is rotatably provided at an end of the support plate 73 in the −Z direction. The gearbox 110 is fixed to the pivot shaft 74. Thus, the gearbox 110, the steering shaft 102, the steering column 1, and the steering wheel 101 are supported by the first bracket 70 to be able to rotate around the pivot shaft 74 (see arrows A1 and A2 in FIG. 1).

As illustrated in FIG. 4, the steering column 1 is an outer cylinder that extends in the X direction and surrounds the steering shaft 102. The steering column 1 includes an upper column 2 and a lower column 3 disposed in the +X direction with respect to the upper column 2. The lower column 3 has a cylindrical shape. An end of the lower column 3 in the +X direction is externally fitted to the housing 111 of the gearbox 110. Here, an opening at an end of the housing 111 in the −X direction is sealed by the lower shaft 109 and the seal member 118. The inside of the housing 111 of the gearbox 110 is excellent in sealing performance. Therefore, even though the air pressure inside the lower column 3 increases, it is difficult for air to enter the inside of the housing 111 through an opening at the end of the lower column 3 in the +X direction.

The upper column 2 is produced by casting. As illustrated in FIGS. 3, 4, and 5, the upper column 2 includes a clamp 10 that is externally fitted to the lower column 3, a cylindrical part 20 that extends from the clamp 10 in the −X direction, an attachment part 30 that is provided at an end of the clamp 10 in the +X direction, a pair of protrusions 40

(only one protrusion is illustrated in FIGS. 3 and 5) that protrudes in the −Z direction from the outer peripheral surface of the clamp 10, and contact ribs 50 (see FIGS. 3 and 5) that extend in the X direction.

The cylindrical part 20 has a circular inner peripheral surface. An inner diameter of the cylindrical part 20 has a size enough to allow the lower column 3 to enter the inside. A bearing 21 is internally fitted to an end of the cylindrical part 20 in the −X direction. The cylindrical part 20 rotatably supports the upper shaft 108 by using the bearing 21. In other words, an opening at the end of the cylindrical part 20 in the −X direction is blocked by the bearing 21 and the upper shaft 108, so that sealing performance is excellent. In a case in which the bearing 21 has a seal (not illustrated) that prevents grease inside the bearing 21 from leaking out, the opening at the end of the cylindrical part 20 in the −X direction has further excellent sealing performance. Therefore, even though the air pressure inside the cylindrical part 20 increases, it is difficult for air to be discharged to the outside through the opening at the end of the cylindrical part 20 in the −X direction. Another configuration of the cylindrical part 20 will be described later.

As illustrated in FIG. 6, the clamp 10 is provided with a slit 11. As illustrated in FIG. 7, the slit 11 of the clamp 10 extends in the X direction. Therefore, the clamp 10 has a circular arc-shaped cross-section and extends in the X direction. While no external force acts on the clamp 10, the inner diameter of the clamp 10 is approximately the same in size as the outer diameter of the lower column 3. In other words, the clamp 10 is slidable on the lower column 3.

As illustrated in FIG. 6, the slit 11 of the clamp 10 is positioned in the −Z direction as viewed from the axis O. Therefore, a groove width of the slit 11 is along the Y direction. According to this, in a case in which a compressive load for fastening the clamp 10 from the Y direction acts on the clamp 10, the clamp 10 deforms so that the groove width of the slit 11 is narrower. In other words, the clamp 10 clamps the lower column 3 disposed therein by reducing its diameter. As a result, a high frictional force acts between an inner peripheral surface of the clamp 10 and an outer peripheral surface of the lower column 3 to restrict the sliding of the upper column 2.

As illustrated in FIGS. 7 and 9, a part of the attachment part 30 in the +Z direction includes a cut-out portion 31. As illustrated in FIG. 7, the attachment part 30 wraps around the lower column 3 in an arc shape in the −Z direction. An attachment rib 32 is provided on an outer peripheral surface of the attachment part 30, which faces the −Z direction. The attachment rib 32 has a female thread hole 33. A bracket (not illustrated) that supports a harness or the like is attached to the female thread hole 33.

A first expansion slit 12 and a second expansion slit 13 whose groove widths are circumferentially wider than that of the slit 11 are provided at both ends of the slit 11 of the clamp 10 in the X direction. Parts of the clamp 10, which are not continuous with the adjacent cylindrical part 20 and the adjacent attachment part 30 in the X-axis direction, increase because of the first expansion slit 12 and the second expansion slit 13. As a result, the clamp 10 is less affected by the rigidity of the cylindrical part 20 and the attachment part 30 and is more easily deformed.

As illustrated in FIG. 7, the pair of protrusions 40 and 40 is disposed so that the slit 11 is interposed therebetween as viewed from the −Z direction. Hereinafter the one protrusion 40 of the pair of protrusions 40 and 40, which is disposed in the −Y direction relative to the slit 11, is referred to as a first protrusion 41, and the other protrusion 40 of the pair of protrusions 40 and 40, which is disposed in the +Y direction relative to the slit 11, is referred to as a second protrusion 42. The first protrusion 41 and the second protrusion 42 extend in the X direction with approximately the same length as that of the clamp 10. As illustrated in FIG. 5, long grooves 43 and 44 extending in the X direction are provided. As illustrated in FIG. 6, the long grooves 43 and 44 penetrate in the Y direction.

As illustrated in FIG. 6, the contact ribs 50 each have a pair of first contact ribs 51 and 51, and a pair of second contact ribs 52 and 52. The first contact ribs 51 protrude from the outer peripheral surface of the clamp 10. The second contact ribs 52 protrude from outer surfaces of the first protrusion 41 and the second protrusion 42, respectively.

As illustrated in FIG. 5, the first contact ribs 51 and the second contact ribs 52 extend in a straight line in the X direction. The first contact ribs 51 overlap the axis O as viewed from the Y direction. Each end of each first contact rib 51 in the −X direction is continuous with a second annular rib 23. The second contact ribs 52 are positioned at the ends of the first protrusion 41 and the second protrusion 42 in the −Z direction, respectively, and extend along edges of the long grooves 43 and 44. As described above, the first contact ribs 51 and the second contact ribs 52 are disposed so that the long grooves 43 and 44 are interposed therebetween.

As illustrated in FIG. 8, the second bracket 80 includes a pair of attachment plates 81 and 81, an upper plate 82, a first side plate 83, and a second site plate 84. The second bracket 80 may be referred to simply as a bracket.

The pair of attachment plates 81 is plate-like members that are disposed to be spaced apart from each other in the Y direction so that the steering column 1 is interposed therebetween. The attachment plates 81 are coupled to the vehicle body by using release capsules 85. Each of the release capsules 85 is disposed at an end of each of the attachment plates 81 in the −X direction. Each of the release capsules 85 is integrated with each of the attachment plates 81 by using each of resin members 86, The release capsules 85 are fixed to a member on the vehicle body side by bolts or the like. In a case in which a load in the +X direction acts on the steering column because of a secondary collision of the vehicle (see arrow D1 in FIG. 1), the resin members 86 are sheared and only the attachment plates 81 move in the +X direction; thereby, the second bracket 80 is released from the vehicle body.

The upper plate 82 is a plate-like member that couples the pair of attachment plates 81 and 81 to each other. The first side plate 83 and the second side plate 84 are plate-like members that extend in the X direction and the Z direction. The first side plate 83 is disposed in the −Y direction relative to the clamp 10. The second side plate 84 is disposed in the +Y direction relative to the clamp 10. In other words, the first side plate 83 and the second side plate 84 are spaced apart from each other in the Y direction so that the clamp 10 of the steering column 1 is interposed therebetween. The first side plate 83 and the second side plate 84 are integrated with the pair of attachment plates 81 and 81, and the upper plate 82 by welding. The first side plate 83 and the second side plate 84 are formed with arc grooves 83a and 84a that extend in the Z direction, respectively. The arc grooves 83a and 84a have an arc shape centered on the pivot shaft 74 (see FIGS. 1, 2, and 3). A protruding plate 87 that protrudes in the −Y direction is provided at an end of the first side plate 83 in the +X direction. Therefore, the first side plate 83 has a higher rigidity in the Y direction than the second side plate 84 does.

The fastening mechanism 90 is a device that fastens the clamp 10 to apply a compressive load to the clamp 10. The fastening mechanism 90 has a fastening shaft 91, an operation lever 92, a fixed cam 93, a rotating cam 94, a nut 95, a spacer 96, and a thrust bearing 97.

The fastening shaft 91 is a rod-shaped member. The fastening shaft 91 is inserted, from the −Y direction toward the +Y direction, into the arc groove 83a of the first side plate 83, the long grooves 43 and 44 of the clamp 10, and the arc groove 84a of the second side plate 84 in this order, and extends in the Y direction. An end of the fastening shaft 91 in the −Y direction is provided with a head 91a The operation lever 92 is coupled near the end of the fastening shaft 91 in the −Y direction. The operation lever 92 extends from the fastening shaft 91 in the −X direction and can be operated by the driver in the vehicle (see FIGS. 1 and 2). In a case in which the driver rotates the operation lever 92 around the fastening shaft 91, the fastening shaft 91 is rotated in conjunction with the rotation of the operation lever 92.

The fixed cam 93 and the rotating cam 94 are disposed between the first side plate 83 and the operation lever 92 in a state of being penetrated by the fastening shaft 91. The fixed cam 93 is adjacent to the first side plate 83. A part of the fixed cam 93 is fitted to the arc groove 83a of the first side plate 83. Accordingly, the fixed cam 93 is not rotated in conjunction with the fastening shaft 91. The rotating cam 94 is adjacent to the operation lever 92. The rotating cam 94 is coupled to the operation lever 92 and is integrally rotated with the operation lever 92. Tilted planes are provided on surfaces of the fixed cam 93 and the rotating cam 94, which face each other, along the peripheral direction. In a case in which the rotating cam 94 is rotated by operation of the operation lever 92, the tilted plane of the fixed cam 93 rides up or goes down on the tilted plane of the rotating cam 94. As a result, a distance in the Y direction between the fixed cam 93 and the rotating cam 94 changes.

An end of the fastening shaft 91 in the +Y direction is provided with a male thread 91b. This male thread 91b is screwed with the nut 95. As a result, the fastening shaft 91 is prevented from falling out of the arc grooves 83a and 84a and the long grooves 43 and 44. The spacer 96 and the thrust bearing 97 are disposed between the second side plate 84 and the nut 95 in a state of being penetrated by the fastening shaft 91. The spacer 96 is brought into contact with the periphery of the arc groove 84a, which is a part of the second side plate 84. The thrust bearing 97 is disposed between the nut 95 and the spacer 96.

As described above, in a case in which the fixed cam 93 and the rotating cam 94 are spaced apart from each other in the Y direction by the operation of the operation lever 92, the head 91a of the fastening shaft 91 is pressed in the −Y direction, and the nut 95 moves toward the −Y direction. Accordingly, a distance in the Y direction between the fixed cam 93 and the spacer 96 is reduced, and a frictional force between the fixed cam 93 and the first side plate 83, and a frictional force between the spacer 96 and the second side plate 84 increase. As a result, the movement of the fastening shaft 91 in the Z direction along the arc grooves 83a and 84a is restricted. Therefore, the movement of the upper column 2 in the Z direction, which is penetrated by the fastening shaft 91, is also restricted, and a position of the steering wheel 101 in the Z direction is secured.

The first side plate 83 and the second side plate 84 are fastened in the Y direction by the fixed cam 93 and the spacer 96. Thus, inner surfaces of the first side plate 83 and the second side plate 84 are brought into contact with the pair of second contact ribs 52 of the upper column 2. The first side plate 83 and the second side plate 84 press the pair of second contact ribs 52 to be compressed against each other. As a result, a compressive load is applied to the first protrusion 41 and the second protrusion 42 in the Y direction. The groove width of the slit 11 of the clamp 10 is narrower to clamp the lower column. As a result, the upper column 2 is secured to the lower column 3, and the movement of the steering wheel 101 in the X direction is restricted.

The first side plate 83 and the second side plate 84 press the pair of first contact ribs 51 and 51 in addition to the pair of second contact ribs 52 and 52. As a result, a compressive load acts on the pair of first contact ribs 51 and 51 to be able to reduce the diameter of the clamp 10. The first contact ribs 51 are spaced apart from the fastening shaft 91 on which a fastening force acts. Therefore, the compressive load acting on the first contact ribs 51 is smaller than the compressive load acting on the second contact ribs 52. On the other hand, even though the compressive load is applied to the second contact ribs 52, the first protrusion 41 and the second protrusion 42 are tilted so that only the ends of the first protrusion 41 and the second protrusion 42 in the Z direction are close to each other; thereby, the slit of the clamp 10 may not be narrowed. In other words, the compressive load can be applied to the clamp 10 by using the first contact ribs 51 without using the first protrusion 41 and the second protrusion 42. Therefore, during the operation of the operation lever 92, the clamp 10 reliably clamps the lower column 3.

By contrast, in a case in which the operation lever 92 is operated to bring the fixed cam 93 and the rotating cam 94 closer to each other in the Y direction, the distance in the Y direction between the fixed cam 93 and the spacer 96 is increased. Thus, a frictional force between the fixed cam 93 and the first side plate 83 is reduced. Accordingly, a frictional force between the spacer 96 and the second side plate 64 is reduced. As a result, the fastening shaft 91 is allowed to move in the Z direction along the arc grooves 83a and 84a In a case in which a load in the Z direction is applied to the steering wheel 101, the steering column 1, the steering shaft 102, and the gearbox 110 are rotated around the pivot shaft 74 in directions of arrow A1 or arrow A2 (see FIG. 1). As a result, a position of the steering wheel 101 in the Z direction is changed.

Fastening on the first contact rib 51 and second contact rib 52 by the first side plate 83 and the second side plate 84 is released. Therefore, the groove width of the slit 11 of the clamp 10 is widened, and clamping onto the lower column 3 is released. In a case in which a load in the X direction is applied to the steering wheel 101, the upper column 2 and the upper shaft 108 slide in the X direction. As a result, a position of the steering wheel 101 in the X direction is changed (see arrow B1 and arrow B2 in FIG. 1).

Next, the details of the cylindrical part 20 of the upper column 2 will be explained. As illustrated in FIG. 5, a first annular rib 22 and a second annular rib 23 that are disposed to be spaced apart from each other in the X direction are provided on an outer peripheral surface 20a of the cylindrical part 20. Four straight linear ribs 24a, 24b, 24c, and 24d (see FIG. 7 regarding the linear rib 24d) that extend in the X direction are provided at a 90-degree interval on the outer peripheral surface 20a of the cylindrical part 20 and between the first annular rib 22 and the second annular rib 23. Thus, the rigidity of the cylindrical part 20 is very high.

Here, as illustrated in FIG. 1, during the secondary collision, a load toward the front of the vehicle acts on the steering wheel 101 (see arrow D1 in FIG. 1). Therefore, as illustrated in FIG. 5, a compressive load (see arrows D2 FIG. 5) acts on a wall in the direction as viewed from the axis O in the cylindrical part 20. In addition, a tensile load (see arrows D3 in FIG. 5) acts on a wall the direction as viewed from the axis O in the cylindrical part 20. In a case in which the cylindrical part 20 is deformed, the lower column 3 may not be able to enter the inside of the cylindrical part 20. In other words, in the event of the secondary collision, it is not possible to absorb the collision energy by shortening the steering shaft 102. As described above, the linear ribs 24a and 24c are ribs for improving the rigidity against the compressive load and the tensile load acting on the cylindrical part 20 during the secondary collision.

As illustrated in FIGS. 5 and 9, the cylindrical part 20 has an air hole 25 that penetrates the outer peripheral surface 20a and an inner peripheral surface 20b of the cylindrical part 20. The air hole 25 is provided in the wall of the cylindrical part 20, which is positioned in the +Y direction as viewed from the axis O, and is adjacent to the linear rib 24b. Thus, even though the air hole 25 is provided in the cylindrical part 20, the rigidity of the wall of the cylindrical part 20, which is disposed in the +Z direction or −Z direction as viewed from the axis O is not reduced. The air hole 25 extends in the Y direction. In other words, the air hole 25 is formed in parallel to a penetration direction of the long grooves 43 and 44 of the protrusions 40. Here, the long grooves 43 and 44 are formed by casting. In detail, the long groove 43 is formed by using a mold released from the upper column 2 in the −Y direction (see arrow C1 in FIG. 6). The long groove 44 is formed by using a mold released from the upper column 2 in the +Y direction (see arrow C2 in FIG. 6). Therefore, releasing directions of the mold for forming the air hole 25 and the mold for forming the long groove 44 are unified, and the air hole 25 and the long groove 44 can be formed with a single mold.

As illustrated in FIG. 9, the inner peripheral surface 20b of the cylindrical part 20 includes a flange 26 that restricts the movement of the bearing 21 in the +X direction, a first inner diameter part 27 that is brought into slide-contact with the outer peripheral surface of the lower column 3, and a second inner diameter part 28 having an inner diameter larger than that of the first inner diameter part 27.

The flange 26 is provided near the end of the cylindrical part 20 in the −X direction. The first inner diameter part 27 is provided near the end of the cylindrical part 20 in the +X direction. The first inner diameter part 27 extends in the +X direction, and is provided across the inner peripheral surface of the clamp 10. In this first inner diameter part 27, the outer peripheral surface of the lower column 3 is a slidable surface in a state where the diameter of the clamp 10 is not reduced. The inner peripheral surface of the clamp 10 is provided with a third inner diameter part 14 which is spaced apart from the first inner diameter part 27 in the +X direction, and of which an inner diameter is the same as the inner diameter of the first inner diameter part 27. In other words, a fourth inner diameter part 15 formed to have a larger diameter than the inner diameters of the first inner diameter part 27 and the third inner diameter part 14 is provided between the first inner diameter part 27 and the third inner diameter part 14. As a result, a clamping force of the clamp 10 is concentrated to the first inner diameter part 27 and the third inner diameter part 14 in a state where the diameter of the clamp 10 is reduced. The second inner diameter part 28 is positioned in the center of the cylindrical part 20 in the X direction. The air hole 25 is positioned in the center of the cylindrical part 20 in the X direction and is spaced apart from the end of the cylindrical part 20 in the +X direction. The air hole 25 then penetrates the second inner diameter part 28.

Next, a relationship between the cylindrical part 20 and the lower column 3 will be explained with reference to FIG. 9. The dashed lines indicated by reference signs 3A, 3B, and 3C indicate end surfaces of the lower column 3 in the −X direction. When a length of the steering shaft 102 is the longest length in the X direction, the upper column 2 slides in the −X direction. In this case, the lower column 3 does not enter the inside of the cylindrical part 20, as indicated by reference sign 3A in FIG. 9.

Thus, the end of the cylindrical part 20 in the +X direction is opened. Air inside the cylindrical part 20 flows from and to the external space through the air hole 25 or the slit 11 of the clamp 10.

Subsequently, in a state where the length of the steering shaft 102 is shortened in the X direction, and the upper column 2 slides in the +X direction, the lower column 3 enters the inside of the cylindrical part 20, as indicated by reference sign 3B in FIG. 9. Accordingly, the inside of the cylindrical part 20 is then continuous with the inside of the lower column 3 via an opening at the end of the lower column 3 in the −X direction (see FIG. 4). In a space formed of the inside of the cylindrical part 20 and the inside of the lower column 3, the end in the +X direction is blocked by the lower shaft 109, the seal member 118, and the gearbox 110. In addition, in the space formed of the inside of the cylindrical part 20 and the inside of the lower column 3, the end in the −X direction is blocked by the bearing 21 and the upper shaft 108. On the other hand, the inside of the cylindrical part 20 communicates with the external space through the air hole 25. Therefore, in a case in which the air pressure in the space formed of the inside of the cylindrical part 20 and the inside of the lower column 3 increases, the air inside the cylindrical part 20 is discharged to the external space through the air hole 25.

Subsequently, when the length of the steering shaft 102 is the shortest length in the X direction, an entry amount of the lower column 3 that enters the inside of the cylindrical part 20 increases, as indicated by reference sign 3C in FIG. 9. In a case in which the entry amount of the lower column 3 is greater than a predetermined amount, the outer peripheral surface of the lower column 3 faces the air hole 25. In other words, the lower column 3 and the air hole 25 overlap in a direction orthogonal to the axis O. Here, an inner diameter of the second inner diameter part 28 is larger than an inner diameter of the first inner diameter part 27, and a gap is generated between the second inner diameter part 28 and the outer peripheral surface of the lower column 3. Therefore, the air inside the cylindrical part 20 flows from and to the external space through the air hole 25 and the gap formed between the second inner diameter part 28 and the outer peripheral surface of the lower column 3. As described above, according to the present embodiment, the air inside the cylindrical part 20 to be discharged to the external space does not pass through between the lower column 3 and the first inner diameter part 27.

As explained above, the steering device 100 of the embodiment includes the telescopic steering shaft 102 that extends in the first direction, and the cylindrical outer steering column 1 that rotatably supports the steering shaft 102. The steering column includes the lower column 3, and the upper column 2 having one end that is slidably attached to the lower column 3 and the other end on which the bearing 21 that supports the steering shaft 102 is provided. The upper column 2 includes the clamp 10 that is externally slidably fitted to the lower column 3 and that has the slit 11 extending in the first direction, and the cylindrical part 20 that has a cylindrical shape and that has one end continuous with the clamp 10 and the other end blocked by the bearing 21 being internally fitted. The cylindrical part 20 has the air hole 25 that is spaced apart from the one end of the cylindrical part 20 and that penetrates the outer peripheral surface 20a and the inner peripheral surface 20b.

The air inside the cylindrical part 20 is discharged to the outside of the external space through the air hole 25. In other words, the air inside the cylindrical part 20 is not discharged from between the outer peripheral surface of the lower column 3 and the inner peripheral surface of the cylindrical part 20. Therefore, it is possible to prevent grease applied to the outer peripheral surface of the lower column 3 and the inner peripheral surface of the cylindrical part 20 from being discharged to the external space.

In the steering device 100 of the embodiment, in the state where the steering shaft 102 is shortened, the lower column 3 and the air hole 25 overlap in the direction orthogonal to the first direction. In addition, the inner peripheral surface 20b of the cylindrical part 20 in the steering device 100 of the embodiment includes the first inner diameter part 27 that can be brought into slide-contact with the outer peripheral surface of the lower column 3 and the second inner diameter part 28 of which the inner diameter is larger than that of the first inner diameter part 27. The air hole 25 penetrates the second inner diameter part 28.

The lower column that has entered the inside of the cylindrical part 20 is supported by the first inner diameter part 27. Therefore, the rattling of the upper column 2 against the lower column 3 is restrained. In addition, the air hole 25 is always opened since the gap is formed between the lower column 3 and the second inner diameter part 28.

The steering device 100 of the embodiment includes the bracket including the first side plate 83 and the second side plate 84 that sandwich the clamp 10 from the second direction orthogonal to the first direction; and the fastening mechanism 90 that has the fastening shaft 91 penetrating the first side plate 83 and the second side plate 84 and that fastens the first side plate 83 and the second side plate 84. The upper column 2 includes the pair of protrusions 40 and 40 between which the slit 11 is interposed, the protrusions 40 and 40 protruding radially outward from the clamp 10 and being pressed by the first side plate 83 and the second side plate 84 during fastening with the fastening mechanism 90. The pair of protrusions 40 and 40 includes the long grooves 43 and 44 into which the fastening shaft 91 is inserted. The penetration direction of the air hole 25 is parallel to the penetration direction of the long grooves 43 and 44.

In a case in which the air hole 25 and the long groove 44 are formed by casting, the releasing directions of the mold for forming the air hole 25 and the mold for forming the long groove 44 are unified, and the air hole 25 and the long groove 44 can be formed with a single mold. Thus, the lower column 3 is easily manufactured.

Although the embodiment is explained as described above, the steering device of the present disclosure is applicable to a steering device in which a lower column includes a cylindrical part and a clamp, and an upper column enters the cylindrical part of the lower column. In other words, the steering device includes a telescopic steering shaft that extends in a first direction, and a cylindrical outer steering column that rotatably supports the steering shaft. The steering column includes the lower column, and the upper column having one end that is slidably attached to the lower column and the other end on which a bearing that supports the steering shaft is provided. The lower column includes a cylindrical part that has a cylindrical shape, and a clamp that protrudes from one end of the cylindrical part, that is externally slidably fitted to the upper column, and that has a slit extending in the first direction. The cylindrical part has an air hole that is spaced apart from the one end of the cylindrical part and that penetrates an outer peripheral surface and an inner peripheral surface of the cylindrical part. With such a steering device, when the upper column enters the cylindrical part of the lower column, the air inside the cylindrical part is discharged to the outside of the external space through the air hole. Therefore, it is possible to prevent grease applied to the outer peripheral surface of the upper column and the inner peripheral surface of the cylindrical part from being discharged to the external space.

In a state where the upper column enters the cylindrical part of the lower column, and the steering shaft is shortened, the upper column and the air hole overlap in the direction orthogonal to the first direction. In this state, the inner peripheral surface of the cylindrical part includes the first inner diameter part that can be brought into slide-contact with the outer peripheral surface of the upper column, and the second inner diameter part having the inner diameter larger than that of the first inner diameter part. In addition, the air hole may penetrate the second inner diameter part. As a result, the upper column that has entered the inside of the cylindrical part is supported by the first inner diameter part. Therefore, the rattling of the upper column against the lower column is eliminated. In addition, the air hole is always opened since the gap is generated between the upper column and the second inner diameter part.

REFERENCE SIGNS LIST

100 Steering device
101 Steering wheel
102 Steering shaft
108 Upper shaft
109 Lower shaft
110 Gearbox
1 Steering column
2 Upper column
3 Lower column
10 Clamp
11 Slit
12 First expansion slit
13 Second expansion slit.
20 Cylindrical part
21 Bearing
25 Air hole
27 First inner diameter part
28 Second inner diameter part
30 Attachment part
40 (41, 42) Protrusion (first protrusion, second protrusion)
43, 44 Long groove
50 Contact rib
51 First contact rib
52 Second contact rib
70 First bracket
74 Pivot shaft
80 Second bracket (bracket)
83 First side plate
84 Second side plate
90 Fastening mechanism 91 Fastening shaft
92 Operation lever
93 Fixed Cam
94 Rotating Cam
95 Nut

The invention claimed is:

1. A steering device comprising:
a telescopic steering shaft that extends in a first direction; and
a cylindrical outer steering column that rotatably supports the steering shaft, wherein
the steering column includes
a lower column, and
an upper column having one end that is slidably attached to the lower column and another end on which a bearing that supports the steering shaft is provided,
the upper column includes
a clamp that is externally slidably fitted to the lower column and that has a slit extending in the first direction, and
a cylindrical part that has a cylindrical shape and that has one end continuous with the clamp and another end blocked by the bearing being internally fitted,
the cylindrical part has an air hole that is spaced apart from the one end of the cylindrical part and that penetrates an outer peripheral surface and an inner peripheral surface of the cylindrical part,
in a state where the steering shaft is shortened, the lower column and the air hole overlap in a direction orthogonal to the first direction,
the inner peripheral surface of the cylindrical part includes
a first inner diameter part that is capable of being brought into slide-contact with an outer peripheral surface of the lower column, and
a second inner diameter part having an inner diameter larger than that of the first inner diameter part, and
the air hole penetrates the second inner diameter part.

2. A steering device comprising:
a telescopic steering shaft that extends in a first direction;
a cylindrical outer steering column that rotatably supports the steering shaft;
a bracket including a first side plate and a second side plate that sandwich thea clamp from a second direction orthogonal to the first direction;
a fastening mechanism that has a fastening shaft penetrating the first side plate and the second side plate to fasten the first side plate and the second side plate, wherein
the steering column includes
a lower column, and
an upper column having one end that is slidably attached to the lower column and another end on which a bearing that supports the steering shaft is provided,
the upper column includes
the clamp that is externally slidably fitted to the lower column and that has a slit extending in the first direction, and
a cylindrical part that has a cylindrical shape and that has one end continuous with the clamp and another end blocked by the bearing being internally fitted,
the cylindrical part has an air hole that is spaced apart from the one end of the cylindrical part and that penetrates an outer peripheral surface and an inner peripheral surface of the cylindrical part,
the upper column includes a pair of protrusions between which the slit is interposed, the protrusions protruding radially outward from the clamp and being pressed by the first side plate and the second side plate during fastening with the fastening mechanism,
the pair of protrusions has long grooves into which the fastening shaft is inserted, and
a penetration direction of the air hole is parallel to a penetration direction of the long grooves.

3. A steering device comprising:
a telescopic steering shaft that extends in a first direction; and
a cylindrical outer steering column that rotatably supports the steering shaft, wherein
the steering column includes
a lower column, and
an upper column having one end that is slidably attached to the lower column and another end on which a bearing that supports the steering shaft is provided,
the lower column includes
a cylindrical part that has a cylindrical shape, and
a clamp that protrudes from one end of the cylindrical part, that is externally slidably fitted to the upper column, and that has a slit extending in the first direction,
the cylindrical part has an air hole that is spaced apart from the one end of the cylindrical part and that penetrates an outer peripheral surface and an inner peripheral surface of the cylindrical part,
in a state where the steering shaft is shortened, the upper column and the air hole overlap in a direction orthogonal to the first direction,
the inner peripheral surface of the cylindrical part includes
a first inner diameter part that is capable of being brought into slide-contact with an outer peripheral surface of the upper column, and
a second inner diameter part having an inner diameter larger than that of the first inner diameter part, and
the air hole penetrates the second inner diameter part.

* * * * *